Dec. 28, 1926.                                        1,612,036
O. J. LOVIK
SEAT
Filed Jan. 12 1925
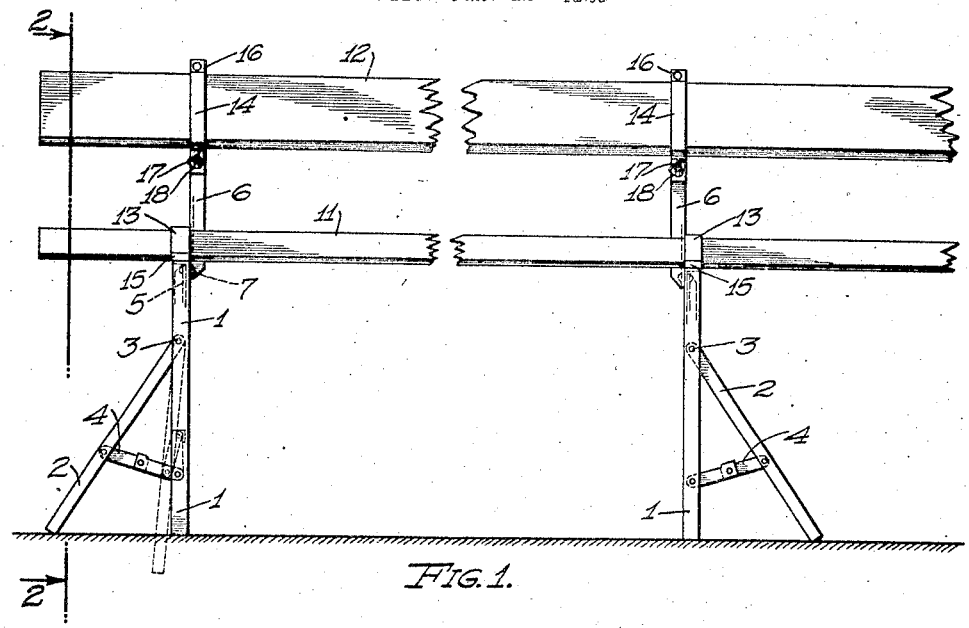
FIG. 1.
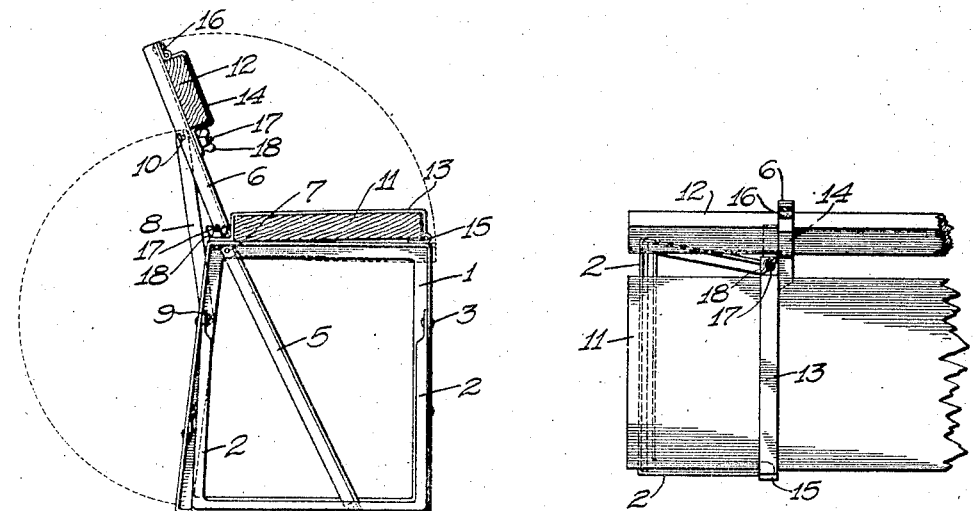
FIG. 2.                                    FIG. 3.
Inventor
OLE J. LOVIK.
By A. B. Bowman
Attorney Patented Dec. 28, 1926.

1,612,036

UNITED STATES PATENT OFFICE.

OLE J. LOVIK, OF MONROVIA, CALIFORNIA, ASSIGNOR TO ELMER T. GALLEY, OF ALTADENA, CALIFORNIA.

SEAT.

Application filed January 12, 1925. Serial No. 1,789.

My invention relates to seats, more particularly to such seats in which the seat and back members may be readily removed from the seat supports, and the objects of my invention are: First, to provide a long seat in which the long seat and back members may be readily and easily removed from their supports for conveniently stacking and transporting the same; second, to provide foldable supports for seats of this class, whereby the same may be folded compactly for conveniently and economically stacking the same or handling the same for transportation purposes; third, to provide supports for seats of this class in which the leg members may be folded relatively to each other and the back supporting brackets folded downwardly toward and against the seat member supporting frame; fourth, to provide supports for seats of this class which are provided with seat and back member retaining straps, whereby said seat and back members may be easily and quickly secured in position to said supports or easily and quickly removed therefrom, as desired; fifth, to provide a novelly constructed seat of this class and a novelly constructed support or seat end therefor, and sixth, to provide a seat which is very simple and economical of construction, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary front elevational view of my seat structure, showing the bracing leg member of one of the supports or seat ends in a folded position relatively to the main frame thereof, by dotted lines; Fig. 2 is an end elevational view thereof, taken at 2—2 of Fig. 1, and Fig. 3 is a fragmentary top view of one end thereof.

Like characters of reference refer to similar parts and portions throughout the several views of the drawings.

The supporting frames 1, bracing leg members 2, bolts 3, collapsible braces 4, braces 5, back member supporting brackets 6, bolts 7, back braces 8, bolts 9 and 10, seat member 11, back member 12, seat member retaining straps 13, back member retaining straps 14, hinge members 15 and 16, bolts 17, and the wing nuts 18, constitute the principal parts and portions of my seat structure.

My seat structure may be provided at each end only with supports of opposite hands, or in case of long seats, with additional supports intermediate the ends of the seat and back members, as fragmentarily illustrated in the drawings. The main portions of these supports consist of substantially rectangular supporting frames 1, made preferably of structural angle iron and braced diagonally by means of braces 5. At the one side of each of the frames 1 and intermediate their upper and lower ends, are pivotally connected, by means of bolts or rivets 3, the ends of the leg portions of the U-shaped bracing leg member 2, also preferably made of structural angle iron. The leg portions of the U-shaped bracing leg member 2 are pivotally connected, by means of the collapsible braces 4, with the sides of the frame 1 intermediate its pivotal connections with the leg member 2 and its lower end. At the upper rear end of the frame 1 and preferably at one side thereof is pivotally connected, by means of a bolt or rivet 7, the back member supporting bracket 6, which extends upwardly and backwardly from the frame 1, as shown in Fig. 2. The bracket 6 is held in said angular position by means of a brace 8, which is pivotally connected at its lower end by means of a rivet or bolt 9 on the rear upright member of the frame 1 and is adapted to be connected to the bracket 6 by means of a bolt or pin 10 provided intermediate the ends of the bracket 6, the free end of the brace 8 being provided with a slotted portion adapted to engage said bolt 10 when said bracket 6 is in an unfolded position, as shown in Fig. 2. To the forward end of the upper side of the frame 1 is secured a hinge member 15 to which is pivotally connected the one end of the substantially U-shaped strap 13, which strap is adapted to be secured to the rear end of the upper side of the frame by means of a bolt 17 and a wing nut 18. The seat member 11, which is preferably a long wide board or plank, is retained in position against the upper side of the frame 1 by said strap 13 which extends over the top and side edges of the seat member. At the upper end of the back member supporting bracket 6 is provided another hinge member 16 to which is pivotally connected the substantially U-shaped metallic strap 14 which is adapted to be secured at its free end by means of a bolt 17 and wing nut 18 to the bracket 6. The back member 12, which is also a long board or plank, is retained in position against the front side of the bracket 6 by said strap 14 engaging the front side and edges of the member 12.

It will be seen that when it is desired to make a long seat, the wing nuts 18 are unloosened and the straps 13 and 14 shifted about their pivotal supports permitting the seat member 11 and the back member 12 to be readily positioned on and against the upper side of the frame 1 and the front side of the bracket 6 and secured in their respective positions.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a seat structure of the class described, a plurality of seat supports, seat back supports foldably secured thereto, long seat and back members mounted on said supports, and substantially U-shaped metallic straps pivotally connected at their one ends to said supports and adapted to extend over said seat and back members for securing the same in position on said supports.

2. In a seat structure of the class described, a plurality of seat supports, seat back supports foldably secured thereto, long seat and back members mounted on said supports, substantially U-shaped metallic straps pivotally connected at their one ends to said supports and adapted to extend over said seat and back members for securing the same in position on said supports, and wing nut means for securing the free ends of said straps to said supports.

3. In a seat structure of the class described, a support provided with a substantially rectangular frame, a bracing leg member pivotally connected to one side of said frame, a shiftable brace connected at its ends intermediate the upper and lower ends of said frame and said bracing leg member, a foldable back member supporting bracket pivotally connected at its one end to the upper rear portion of said frame, a brace connected to and supporting said bracket in an angular position relatively to said frame, a seat member supported at the upper side of said frame, a back member supported at the front side of said bracket, and substantially U-shaped straps pivotally mounted at their one ends respectively to said frame and said bracket and extending over said seat and back members for securing the same in position to said frame and said bracket.

In testimony whereof, I have hereunto set my hand at Los Angeles, California, this 22nd day of December, 1924.

OLE J. LOVIK.